US012696262B2

(12) United States Patent
Lightstone

(10) Patent No.: US 12,696,262 B2
(45) Date of Patent: Jul. 28, 2026

(54) UPLINK SCHEDULING COORDINATION FOR DUAL CONNECTIVITY NETWORKING

(71) Applicant: Telefonaktiebolaget LM Ericsson (publ), Stockholm (SE)

(72) Inventor: Leonard Lightstone, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 773 days.

(21) Appl. No.: 18/006,911

(22) PCT Filed: Aug. 11, 2020

(86) PCT No.: PCT/IB2020/057554
§ 371 (c)(1),
(2) Date: Jan. 26, 2023

(87) PCT Pub. No.: WO2022/034356
PCT Pub. Date: Feb. 17, 2022

(65) Prior Publication Data
US 2023/0300819 A1     Sep. 21, 2023

(51) Int. Cl.
*H04W 72/12*        (2023.01)
*H04W 72/1273*      (2023.01)

(52) U.S. Cl.
CPC ...  *H04W 72/1215* (2013.01); *H04W 72/1273* (2013.01)

(58) Field of Classification Search
CPC ......... H04W 72/1215; H04W 72/1273; H04W 72/1268; H04W 72/27; H04W 72/0446
See application file for complete search history.

(56) References Cited

U.S. PATENT DOCUMENTS

| | | | | |
|---|---|---|---|---|
| 9,504,058 B2 * | 11/2016 | Shperling | ......... | H04W 72/1215 |
| 10,757,699 B2 * | 8/2020 | Kang | .................. | H04W 72/566 |

(Continued)

FOREIGN PATENT DOCUMENTS

| | | | | |
|---|---|---|---|---|
| WO | WO-2014168527 A1 * | 10/2014 | ......... | H04W 72/542 |
| WO | WO-2015077930 A1 * | 6/2015 | ........... | H04B 17/318 |

(Continued)

OTHER PUBLICATIONS

3GPP TSG RAN WG3 Meeting #97bis R3-173702 Prague, Czech Republic, Oct. 9-13, 2017 (Year: 2017).*

(Continued)

*Primary Examiner* — Nizar N Sivji
(74) *Attorney, Agent, or Firm* — Weisberg I.P. Law, P.A.

(57)            ABSTRACT

A first network node in a first radio area network (RAN) is configured to communicate with at least a second node in a second RAN. The first node is configured to establish scheduling for a transmission from the first node to a wireless device (WD) based at least in part on scheduling of the second node for another transmission to the WD. The first node may be configured to change scheduling for the first node faster than scheduling for the second node. The first RAN may be based on 3rd Generation Partnership Project (3GPP), New Radio standards, and the second RAN based on 3GPP Long-Term-Evolution standards. The first node may set a timing parameter for a transmission such that a multi-slot time window exists to convey to the first node information about an uplink scheduling decision the second node has made for an uplink slot.

26 Claims, 9 Drawing Sheets

(56)                    References Cited

U.S. PATENT DOCUMENTS

| | | | | |
|---|---|---|---|---|
| 2015/0215961 A1* | 7/2015 | Vannithamby | ........ | H04L 5/0005 |
| | | | | 370/336 |
| 2017/0013566 A1* | 1/2017 | Qu | ........................ | H04W 72/23 |
| 2017/0367062 A1* | 12/2017 | Patel | ................. | H04W 72/1268 |
| 2018/0227960 A1* | 8/2018 | Belghoul | .............. | H04W 76/16 |
| 2019/0223181 A1* | 7/2019 | Sun | ..................... | H04W 52/325 |
| 2022/0182947 A1* | 6/2022 | Pelletier | ............ | H04W 72/0473 |
| 2023/0078556 A1* | 3/2023 | Savas | ........................ | H04L 5/14 |
| 2024/0396682 A1* | 11/2024 | Nigam | ................. | H04L 5/0051 |
| 2024/0413881 A1* | 12/2024 | Duan | ................... | H04B 7/0695 |

FOREIGN PATENT DOCUMENTS

| | | | | |
|---|---|---|---|---|
| WO | WO-2019097476 A1 * | 5/2019 | ......... | H04W 72/541 |
| WO | WO-2020107439 A1 * | 6/2020 | ............ | H04W 72/27 |

OTHER PUBLICATIONS

3GPP TSG-RAN WG3 Meeting #97bis R3-173860 Prague, Czech Republic, Oct. 9-13, 2017 (Year: 2017).*

3GPP TSG-RAN WG1 NR_AH #3 R1-1716696 Nagoya, Japan, Sep. 18-21, 2017 (Year: 2017).*

International Search Report and Written Opinion dated May 10, 2021 issued in PCT Application No. PCT/IB2020/057554 filed Aug. 11, 2020, consisting of 13 pages.

3GPP TS 37.340 V16.1.0 (Mar. 2020) 3rd Generation Partnership Project; Technical Specification Group Radio Access Network; Evolved Universal Terrestrial Radio Access (E-UTRA) and NR; Multi-connectivity; Stage 2 (Release 16), consisting of 74 pages.

3GPP TS 36.423 V16.1.0 (Mar. 2020) 3rd Generation Partnership Project; Technical Specification Group Radio Access Network; Evolved Universal Terrestrial Radio Access Network (E-UTRAN); X2 application protocol (X2AP) (Release 16), consisting of 438 pages.

3GPP TSG-RAN WG3 Meeting #97bis; R3-173860; Source: VIVO; Title: Design of Backhaul Signaling for Harmonic Interference Handling; Agenda Item: 10.14; Document for: Discussion and Decision, consisting of 3 pages.

* cited by examiner

UPLINK SCHEDULING COORDINATION FOR DUAL CONNECTIVITY NETWORKING

CROSS-REFERENCE TO RELATED APPLICATIONS

This application is a Submission Under 35 U.S.C. § 371 for U.S. National Stage Patent Application of International Application Number: PCT/IB2020/057554, filed Aug. 11, 2020 entitled "UPLINK SCHEDULING COORDINATION FOR DUAL CONNECTIVITY NETWORKING," the entirety of which is incorporated herein by reference.

TECHNICAL FIELD

Wireless communication and in particular, uplink scheduling coordination for network nodes.

BACKGROUND

The introduction of $3^{rd}$ Generation Partnership Project (3GPP) 5th Generation (5G) (also called New Radio (NR)) standards based networks into the market is moving forward using a step-wise approach. As a first step, 5G is used with support of 4th Generation (4G) Long-Term-Evolution (LTE) as an anchor to provide signaling and some user traffic. This configuration is known as "non-standalone" (NSA). Eventually, 5G will be fully deployed in a standalone configuration where both data and signaling/control is maintained solely on 5G.

In non-standalone operation the wireless device (WD) 6 maintains an uplink (UL), i.e., from the WD 6 to the network nodes 8a and 8b, and a downlink (DL), i.e., from the network nodes 8a and 8b to the WD 6 on both the 5G NR cell 2 and 4G LTE cell 4 communication channels as shown in FIG. 1. The load on each UL communication channel will depend on the specifics of the signaling traffic volume, which may be on the LTE channel in NSA, and the user traffic, which may be split between both uplink legs.

In NSA configurations, it is expected that the NR and LTE schedulers are designed to work independently. This choice comes naturally as a result of LTE being the legacy technology on which the newer NR technology in overlaid. Furthermore, for the band combinations used to support the WD with Evolved Universal Terrestrial Radio Access Network Dual Connectivity (EN-DC), the NR and LTE schedulers may be in physically different boxes or network nodes which may, or may not, be colocated at a central site.

These two network nodes may communicate at a high level through an $X_n$ interface. In the context of EN-DC, this communication over the $X_n$ interface is primarily to set up, or remove, the NR cell on the secondary node (SN). There may also be direct MAC-to-MAC communication of a proprietary nature through MAC-to-MAC scheduler interface. FIG. 2 is an illustration of an LTE master node (MN) 8b communicating with a NR secondary node (SN) 8a through $X_n$ and MAC-to-MAC scheduler interfaces.

The WDs all have finite maximum transmit power, for example as specified by $3^{rd}$ Generation Partnership Project (3GPP) standards (typically 23 dBm). A WD may have additional limitations which are unique to the specifics of the WD design. Two key potential issues are inter-modulation products (IMD), and single-Tx limitations.

When UL transmissions occur simultaneously on a given WD in two different channels, intermodulation products may be generated that fall into the receive spectrum for that same WD. The result of these IMDs can be a high error rate on the DL shared traffic channels, or even on the control channels. In some cases, depending on the nature of the IMD products generated, simultaneous transmission on the two UL channels can be tolerated provided they are restricted in some way. For example, one channel or the other may use low power or uses physical resource blocks (PRBs) in a limited position in the channel bandwidth.

In certain cases, for example intra-band EN-DC, only one power amplifier (PA) may be available for the WD. In these situations, the WD may only execute single transmit, also called single uplink operation (SUO).

Though the limitations stem from different issues, the common result is that for certain band combinations a WD may not be able to transmit on LTE and NR simultaneously in the same slot or may be constrained in the UL transmissions on the multiple DC legs in some way. For some band combinations, the standard allows the use of a restricted set of time domain (TDM) patterns that can be Radio Resource Control (RRC) configured at call set up and can be used to enforce SUO. In the NSA configuration described above, the WD may have simultaneous access to the UL channels on both LTE and NR. However, the WD has a finite power transmission capability. If the two UL schedulers act independently, they may require of the WD in any given UL slot power that exceeds the WD's capabilities.

When the above occurs, the 3GPP standard mandates that the required power be given to the LTE leg, and the NR leg will use whatever transmit power is remaining. If the NR power deficit is significant, the NR transmission may be received in error because signal-to-interference is much worse than the scheduler is expecting. The NR power deficit may be so large as to prevent any transmission (decided autonomously by the WD) of NR during the slot where simultaneous transmissions have been scheduled. In either case, the result is a receive error at the network node. If this error condition occurs rarely, the hybrid acknowledge response (HARQ) may recover. If this error condition occurs frequently, increased Radio Link Control (RLC) retransmits and/or impacts to link adaptation control can occur, either of which may result in degraded performance of the NR leg.

The enforced application of SUO via prescribed TDM patterns (to avoid IMD issues or other) is limited in a few ways:

The patterns have limited configurations and require an RRC reconfiguration to change. This means that the patterns can only be changed slowly.

Not all WDs will support TDM patterns.

SUO pattern is binary and does not allow the option of simultaneous coordinated transmission on both legs in an UL slot.

SUMMARY

Some embodiments advantageously provide a method and system for coordinated scheduling between the LTE and NR UL schedulers in an EN-DC configuration. Embodiments may rely on the LTE use of fixed timing relationships governing when scheduling requests and/or grants are issued and when the corresponding UL transmission occurs. This predictability may be exploited by the more flexible NR timing for its UL scheduling. Combining the LTE predictability with a reference uplink pattern and the NR flexibility, it may be possible to achieve coordinated UL scheduling with relaxed timing requirements between the two schedulers.

According to one aspect of the disclosure, a first network node in a first radio area network (RAN) is configured to communicate with at least a second network node in a second RAN. The first network node comprises processing circuitry configured to establish scheduling for a transmission from the first network node to a wireless device (WD) based at least in part on scheduling of the second network node for another transmission to the WD.

According to one or more embodiments of this aspect, the processing circuitry is further configured to change scheduling for the first network node so that a shorter time interval exists between when an activity is scheduled by the first network node and when a result is broadcast by the first network node than a time interval between when an activity is scheduled by the second node and when a result is broadcast by the second network node. According to one or more embodiments of this aspect, the first network node receives from the second network node information indicating the second network node's scheduling activities for the WD. According to one or more embodiments of this aspect, the information indicating the second node's scheduling activities for the WD includes at least one of information indicating scheduling of an activity on an uplink, UL, slot of interest and information indicating a forecast power to be used by WD to execute the activity. According to one or more embodiments of this aspect, the first RAN is based on 3rd Generation Partnership Project, 3GPP, new radio, NR, standards and the second RAN is based on 3GPP Long-Term-Evolution, LTE, standards. According to one or more embodiments of this aspect, the first RAN and the second RAN are based on 3rd Generation Partnership Project, 3GPP, new radio, NR, standards. According to one or more embodiments of this aspect, the processing circuitry is further configured to stop basing scheduling for a transmission to the WD on the second network node's scheduling for a transmission to the WD when a communication link between the first network node and WD is removed. According to one or more embodiments of this aspect, the processing circuitry is further configured to receive an uplink, UL, reference pattern between at least two schedulers. According to one or more embodiments of this aspect, the processing circuitry is further configured to receive an uplink, UL, reference pattern for multiple WDs on an individual WD by WD basis. According to one or more embodiments of this aspect, the processing circuitry is further configured to change an uplink, UL, reference pattern. According to one or more embodiments of this aspect, the processing circuitry is further configured to assess loading of transmissions between the WD and the first network node, and the WD and the second network node. According to one or more embodiments of this aspect, the processing circuitry is further configured to alter New Radio, NR, parameter k2. According to one or more embodiments of this aspect, the processing circuitry is further configured to schedule a downlink, DL, hybrid automatic repeat request, HARQ, response to avoid uplink, UL, slots that have been committed to the second RAN. According to one or more embodiments of this aspect, the processing circuitry is further configured to determine scheduling based on at least one of a time domain duplex, TDD, pattern, a frequency domain duplex, FDD, pattern and a numerology difference between the first and second RAN. According to one or more embodiments of this aspect, the processing circuitry is further configured to set a timing parameter for a transmission such that a multi-slot time window exists to convey to information to the first network node about an UL scheduling decision the second network node has made for at least one UL slot.

According to another aspect of the disclosure, a method performed by a first network node in a first radio area network, RAN, configured to communicate with at least a second network node in a second RAN. The method comprises establishing scheduling for a transmission from the first network node to a wireless device, WD, based at least in part on scheduling of the second network node for another transmission to the WD.

According to one or more embodiments of this aspect, the method further comprises changing scheduling for the first network node so that a shorter time interval exist between when an activity is scheduled by the first network node and when a result is broadcast by the first network node than a time interval between when an activity is scheduled by the second node and when a result is broadcast by the second network node. According to one or more embodiments of this aspect, the method further comprises the first network node receiving from the second network node information indicating the second network node's scheduling activities for the WD. According to one or more embodiments of this aspect, the information indicating the second node's scheduling activities for the WD includes at least one of information indicating scheduling of an activity on an uplink, UL, slot of interest and information indicating a forecast power to be used by WD to execute the activity. According to one or more embodiments of this aspect, the first RAN is based on 3rd Generation Partnership Project, 3GPP, new radio, NR, standards and the second RAN is based on 3GPP Long-Term-Evolution, LTE, standards. According to one or more embodiments of this aspect, the first RAN and second RAN are based on 3rd Generation Partnership Project, 3GPP, new radio, NR, standards. According to one or more embodiments of this aspect, the method further comprises stopping the basing of the scheduling for a transmission to the WD on the second network node's scheduling for a transmission to the WD when a communication link between the first network node and WD is removed. According to one or more embodiments of this aspect, the method further comprises receiving an uplink, UL, reference pattern between at least two schedulers. According to one or more embodiments of this aspect, the method further comprises receiving an uplink, UL, reference pattern for multiple WDs on an individual WD by WD basis. According to one or more embodiments of this aspect, the method further comprises changing an uplink, UL, reference pattern. According to one or more embodiments of this aspect, the method further comprises assessing loading of transmissions between the WD and the first network node, and the WD and the second network node. According to one or more embodiments of this aspect, the method further comprises altering New Radio, NR, parameter k2. According to one or more embodiments of this aspect, the method further comprises scheduling a downlink, DL, hybrid automatic repeat request, HARQ, response to avoid uplink, UL, slots that have been committed to the second RAN. According to one or more embodiments of this aspect, the method further comprises determining scheduling based on at least one of a time domain duplex, TDD, pattern, a frequency domain duplex, FDD, pattern and a numerology difference between the first and second RAN. According to one or more embodiments of this aspect, the method further comprises set a timing parameter for a transmission such that a multi-slot time window exists to convey to information to the first network node about an UL scheduling decision the second network node has made for at least one UL slot.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
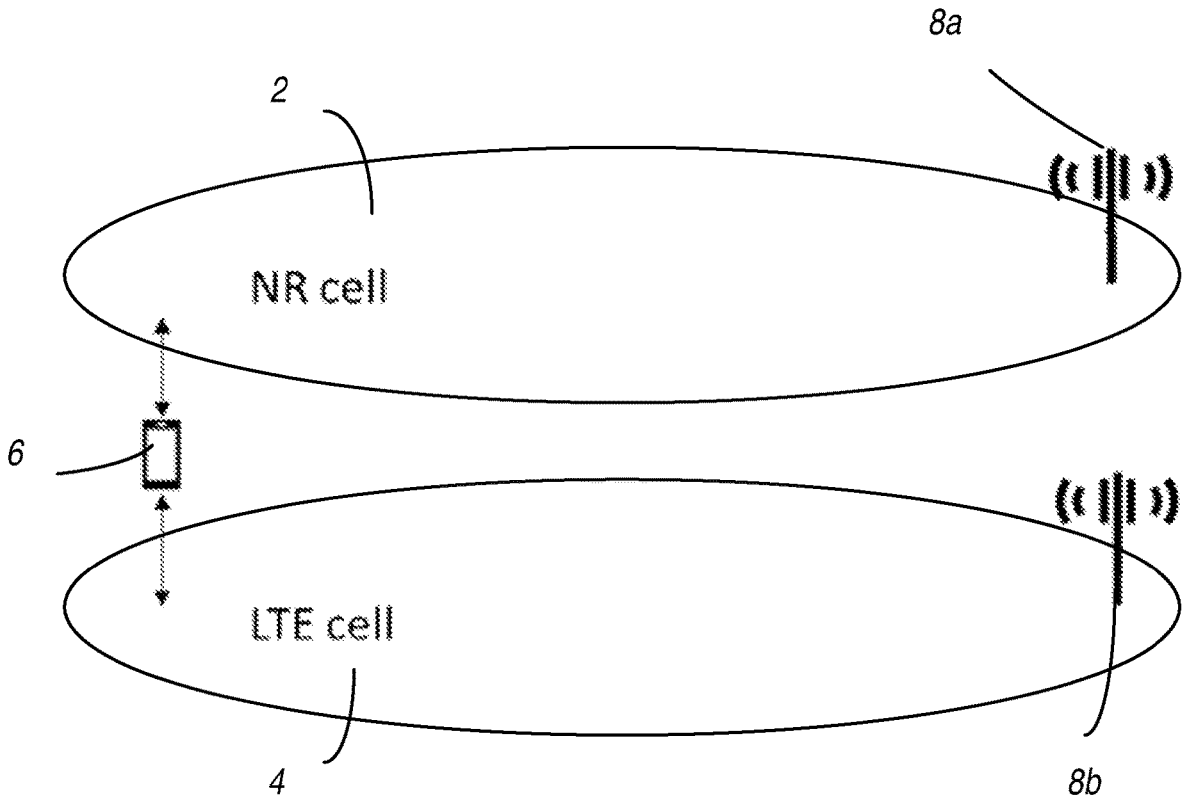
FIG. 1 is a schematic diagram of example non-standalone operation according to the principles in the present disclosure.
Figure 2:
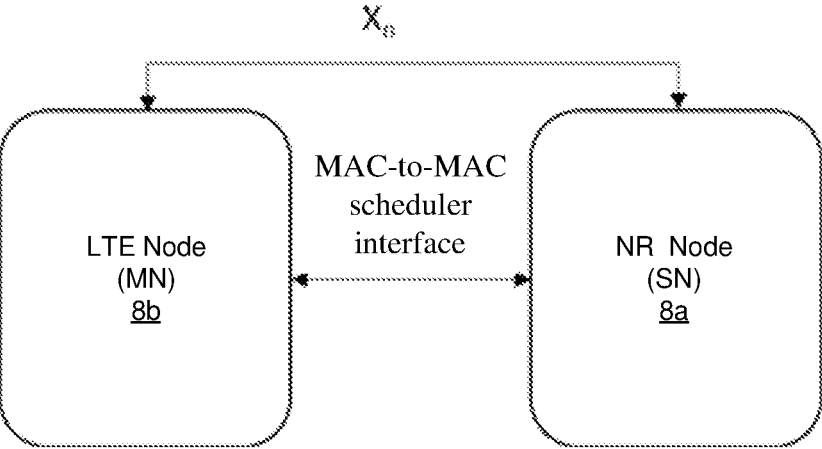
FIG. 2 is a schematic diagram of an example LTE master node (MN) communicating with a NR secondary node (SN) according to the principles in the present disclosure.

Embodiments may have one or more of the following advantages with respect to the problems discussed herein.

The coordination between two schedulers, i.e., the scheduler in the NR network node and the scheduler in the LTE network node, may support communication latencies of the order of 1 to 2 ms. This attribute makes coordination between schedulers in different hardware boxes and even at different sites quite practical over a self-designed Layer-2 (L2) switched or internet protocol (IP) routed network. For example, two nodes separated by 6 km and connected by optical fiber with two L2 switches in the path, each with a delay of 5 μs, will experience a one-way communication latency of 40 μs.

The coordination information exchanged is small in volume.

The extra processing required to handle the coordination is minimal.

The solution is robust to errors or loss of coordination information exchanged between the two schedulers.

The coordination is flexible in its ability to deal with the different aspects of UL coordination described above as well as dynamically adjust the slot-by-slot sharing between the two uplinks.

Before describing in detail example embodiments, it is noted that the embodiments reside primarily in combinations of apparatus components and processing steps related to establishing scheduling for a transmission from a first network node to a WD based at least in part on scheduling of a second network node for another transmission to the WD. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
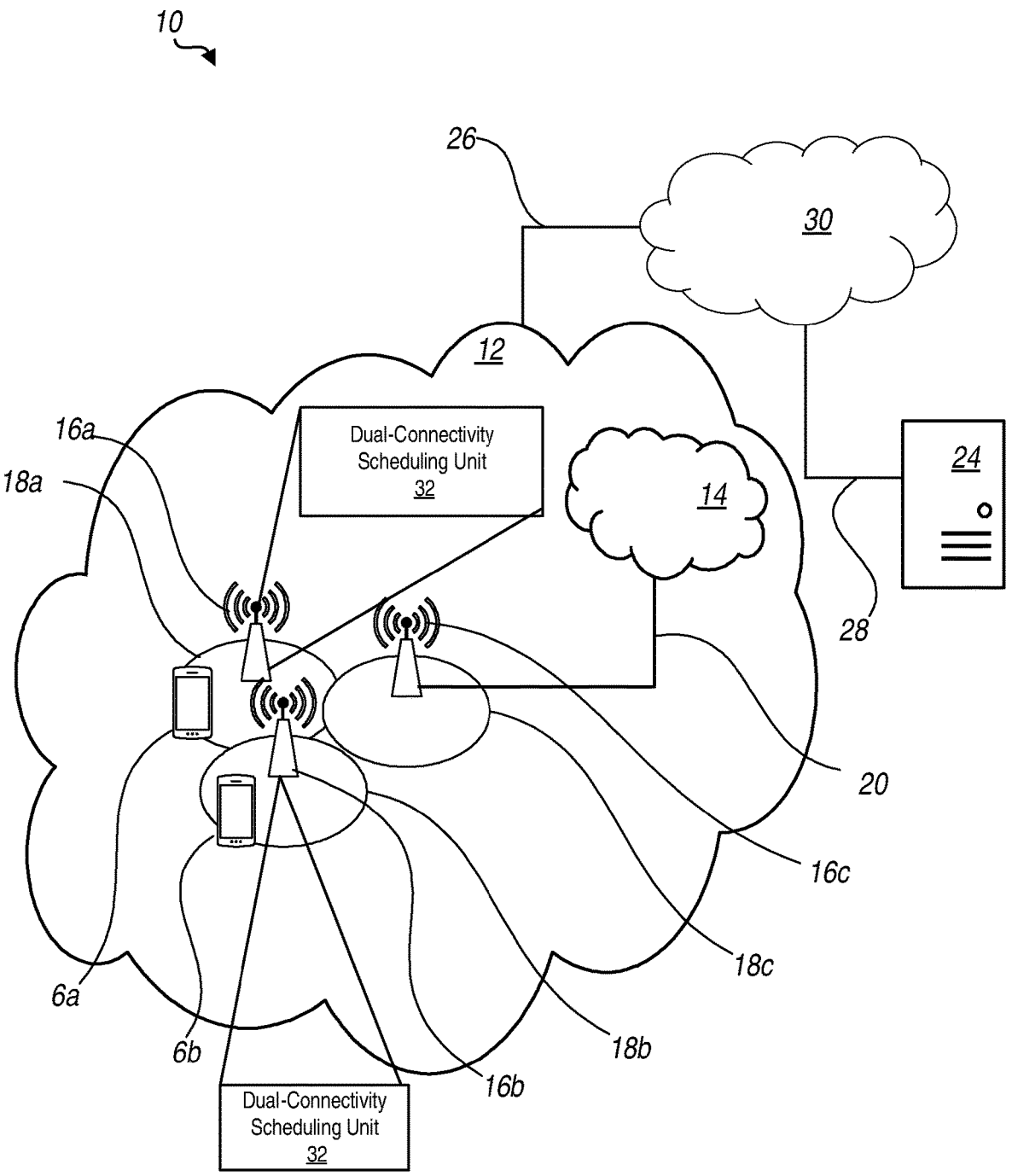
FIG. 3 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 6a located in coverage area 18a is configured to wirelessly connect to, or be paged by, the corresponding network node 16a. A second WD 6b in coverage area 18b is wirelessly connectable to the corresponding network node 16b. While a plurality of WDs 6a, 6b (collectively referred to as wireless devices 6) are illustrated in this example, the disclosed embodiments are equally applicable to a situation where a sole WD is in the coverage area or where a sole WD is connecting to the corresponding network node 16. Note that although only two WDs 6 and three network nodes 16 are shown for convenience, the communication system may include many more WDs 6 and network nodes 16.

Also, it is contemplated that a WD 6 can be in simultaneous communication and/or configured to separately communicate with more than one network node 16 and more than one type of network node 16. For example, a WD 6 can have dual connectivity with a network node 16 that supports LTE and the same or a different network node 16 that supports NR. As an example, WD 6 can be in communication with an eNB for LTE/E-UTRAN and a gNB for NR/NG-RAN. WD 6 may be communicating with network nodes 16a and 16b. Further, network nodes 16a and 16b may be operating in different RANs. For example, in some embodiments, network node 16a may be in a NR RAN and network node 16b may be in an LTE RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 6a, 6b and the host computer 24. The connectivity may be described as an over-the-top (OTT) connection. The host computer 24 and the connected WDs 6a, 6b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 6a. Similarly, the network node 16 need not be aware of the future routing of an outgoing uplink communication originating from the WD 6a towards the host computer 24.

A network node 16a is configured to include a dual-connectivity scheduling unit 32a which is configured to establish scheduling for a transmission from a first network node 16 to a WD 6 based at least in part on scheduling of a second network node 16 for another transmission to the WD 6. Additional network nodes, e.g., network node 16*b*, may also be equipped with dual-connectivity scheduling units 32 which are configured to establish scheduling for a transmission from a first network node 16*a* to a WD 6 based at least in part on scheduling of a second network node 16*b* for another transmission to the WD 6. It is understood that the structure and/or specific functionality of a scheduling unit 32 operating in one RAN, e.g., a NR RAN, may differ from the structure and/or specific functionality of a scheduling unit 32 operating in a different RAN, e.g., a LTE RAN. Reference designator "32" is intended to convey that the network node 16 includes a scheduling unit that is able to schedule transmissions based on information relating to multiple RANs, for example based on information provided via an $X_n$ or MAC-to-MAC scheduler interface. A wireless device 6 is configured to include a dual-connectivity unit 34 which is configured to handle DL transmissions from, and UL transmissions to, network nodes according to the received DL allocations and UL grants etc. from the network nodes 16.

Example implementations, in accordance with an embodiment, of the WD 6, network nodes 16*a* and 16*b* and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 6 connecting via an OTT connection 52 terminating at the WD 6 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network nodes 16*a* and 16*b* and or the wireless device 6. The processing circuitry 42 of the host computer 24 may include a master control unit 54 configured to enable the service provider to control and monitor the scheduling of communications between a WD 6 and at least two network nodes 16*a* and 16*b*.

The communication system 10 further includes a network node 16*a* provided in a communication system 10 and including hardware 58 enabling it to communicate with the host computer 24 and with the WD 6. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 6 located in a coverage area 18 served by the network node 16*a*. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16*a* further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16*a* further has software 74 stored internally in, for example, memory 72, or stored in external memory (e.g., database, storage array, network storage device, etc.) accessible by the network node 16*a* via an external connection. The software 74 may be executable by the processing circuitry 68. The processing circuitry 68 may be configured to control any of the methods and/or processes described herein and/or to cause such methods, and/or processes to be performed, e.g., by network node 16*a*. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16a. For example, processing circuitry 68 of the network node 16a may include a dual-connectivity scheduling unit 32 configured to establishing scheduling for a transmission from network node 16 to a WD 6 based at least in part on scheduling of a second network node 16 for another transmission to the WD 6. Additional network nodes 16b may be provided with interfaces, processing circuitry and dual-connectivity scheduling units 32 of the same general types as described herein and have been omitted for ease of understanding.

The communication system 10 further includes the WD 6 already referred to. The WD 6 may have hardware 80 that may include a radio interface 82 configured to set up and maintain a wireless connection 64 with a network node 16 serving a coverage area 18 in which the WD 6 is currently located. The WD 6 may have hardware 80 that may include a radio interface 82 configured to set up and maintain wireless connections 64 and 96 with multiple network nodes 16a and 16b serving a coverage area 18 in which the WD 6 is currently located. The radio interface 82 may be formed as or may include, for example, one or more RF transmitters, one or more RF receivers, and/or one or more RF transceivers.

The hardware 80 of the WD 6 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 6 may further comprise software 90, which is stored in, for example, memory 88 at the WD 6, or stored in external memory (e.g., database, storage array, network storage device, etc.) accessible by the WD 6. The software 90 may be executable by the processing circuitry 84. The software 90 may include a client application 92. The client application 92 may be operable to provide a service to a human or non-human user via the WD 6, with the support of the host computer 24. In the host computer 24, an executing host application 50 may communicate with the executing client application 92 via the OTT connection 52 terminating at the WD 6 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 6. The processor 86 corresponds to one or more processors 86 for performing WD 6 functions described herein. The WD 6 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 6. For example, the processing circuitry 84 of the wireless device 6 may include a dual-connectivity unit 34 configured to receive transmissions from a first network node 16a to the WD 6 based at least in part on scheduling of a second network node 16b for another transmission to the WD 6.

Figure 4:
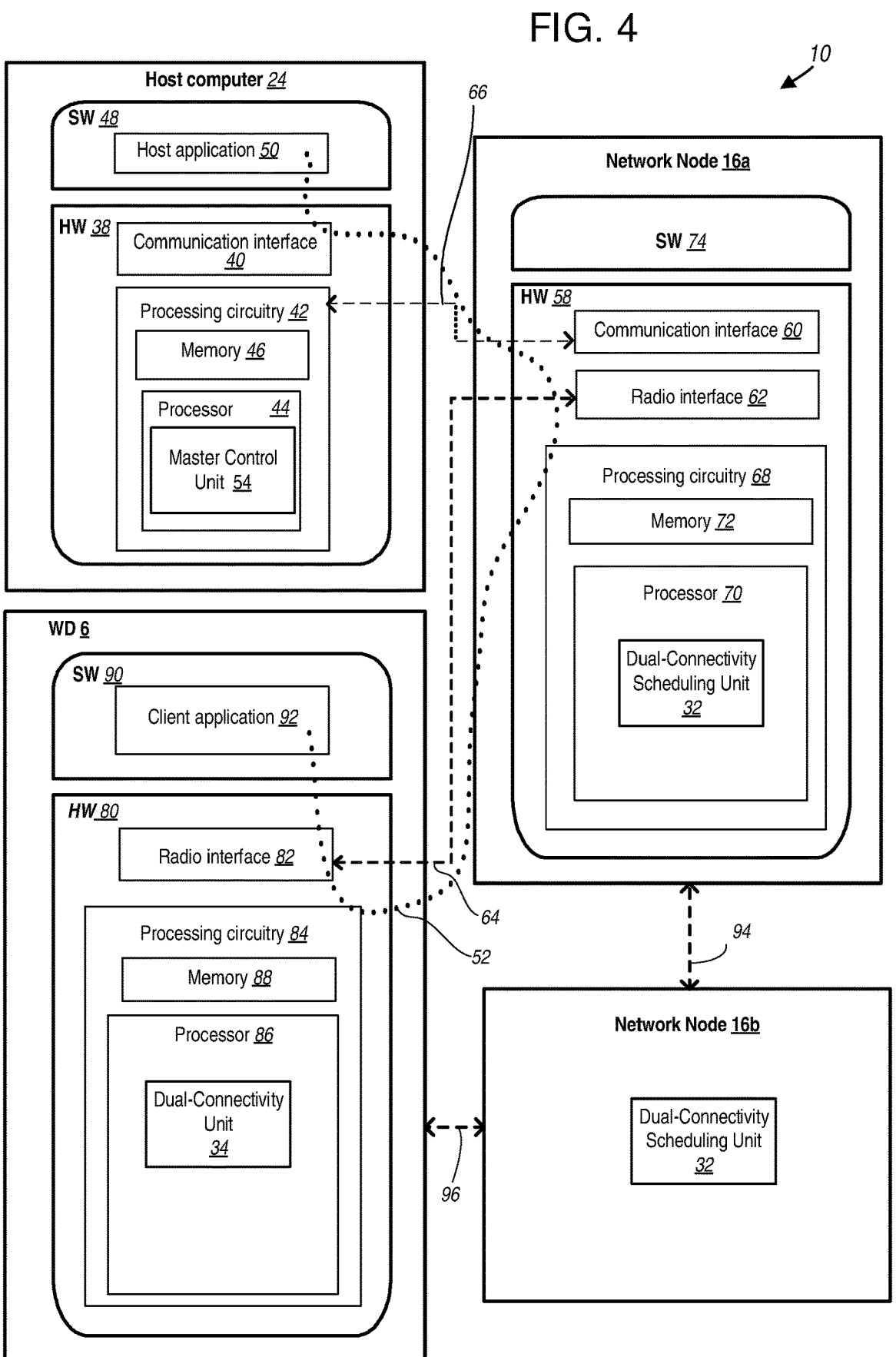
FIG. 4 is a block diagram of a host computer communicating via a network node with a wireless device over an at least partially wireless connection according to some embodiments of the present disclosure.

In some embodiments, the inner workings of the network nodes 16, WD 6, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 6 via the network node 16a, without explicit reference to any intermediary devices and the precise routing of messages via these devices. Network infrastructure may determine the routing, which it may be configured to hide from the WD 6 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connections 64 and 96 between the WD 6 and the network nodes 16a and 16b, and the connection between the nodes 16a and 16b, are in accordance with the teachings of the embodiments described throughout this disclosure. One or more of the various embodiments improve the performance of OTT services provided to the WD 6 using the OTT connection 52, in which the wireless connections 64 and 96 may form the last segment. In some embodiments, the connection 94 between the nodes 16a and 16b may be a $X_1$ or MAC-to-MAC scheduler interface as discussed herein. For the sake of simplicity, the OTT connection from WD 6 to host computer 24 via the network node 16b is not shown. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 6, in response to variations in the measurement results. The measurement procedure and/or the network functionality for reconfiguring the OTT connection 52 may be implemented in the software 48 of the host computer 24 or in the software 90 of the WD 6, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 6. In some embodiments, the cellular network also includes the network node 16 with a radio interface 62. In some embodiments, the network node 16 is configured to, and/or the network node's 16 processing circuitry 68 is configured to establish scheduling for a transmission from the network node 16*a* to a WD 6 based at least in part on scheduling of a second network node 16*b* for another transmission to the WD 6.

In some embodiments, the host computer 24 includes processing circuitry 42 and a communication interface 40 that is configured to a communication interface 40 configured to receive user data originating from a transmission from a WD 6 to a network node 16. In some embodiments, the WD 6 is configured to, and/or comprises a radio interface 82 and/or processing circuitry 84 configured to perform the functions and/or methods described herein for receiving transmissions from a first network node 16*a* to the WD 6 based at least in part on scheduling of a second network node 16*b* for another transmission to the WD 6.

Although FIGS. 3 and 4 show various "units" such as dual-connectivity scheduling unit 32, and dual-connectivity unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
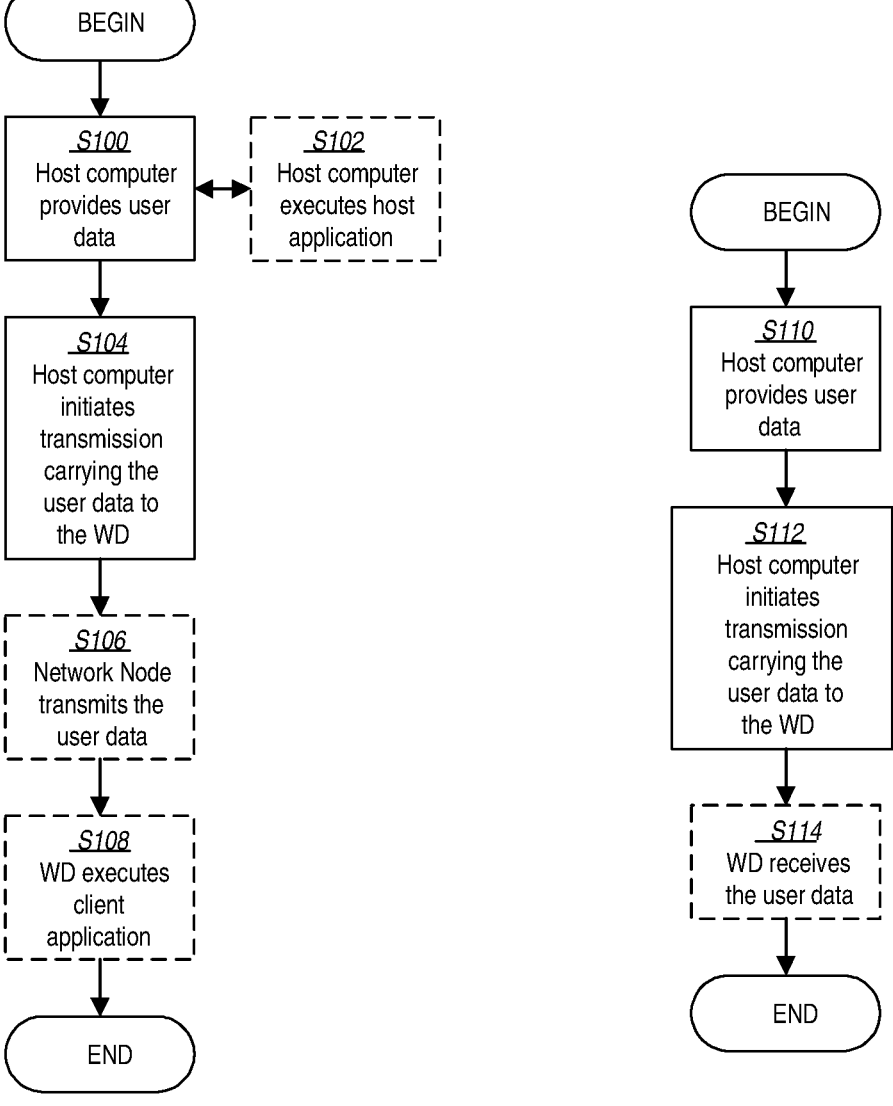
FIG. 5 is a flowchart illustrating example methods implemented in a communication system including a host computer, a network node and a wireless device for executing a client application at a wireless device according to some embodiments of the present disclosure.
FIG. 6 is a flowchart illustrating example methods implemented in a communication system including a host computer, a network node and a wireless device for receiving user data at a wireless device according to some embodiments of the present disclosure.

FIG. 5 is a flowchart illustrating an example method implemented in a communication system, such as, for example, the communication system of FIGS. 3 and 4, in accordance with one embodiment. The communication system may include a host computer 24, a network node 16 and a WD 6, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 6 (Block S104). In an optional third step, the network node 16 transmits to the WD 6 the user data which was carried in the transmission that the host computer 24 initiated, in accordance with the teachings of the embodiments described throughout this disclosure (Block S106). In an optional fourth step, the WD 6 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a WD 6, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 6 (Block S112). The transmission may pass via the network node 16, in accordance with the teachings of the embodiments described throughout this disclosure. In an optional third step, the WD 6 receives the user data carried in the transmission (Block S114).

Figures 7, 8:
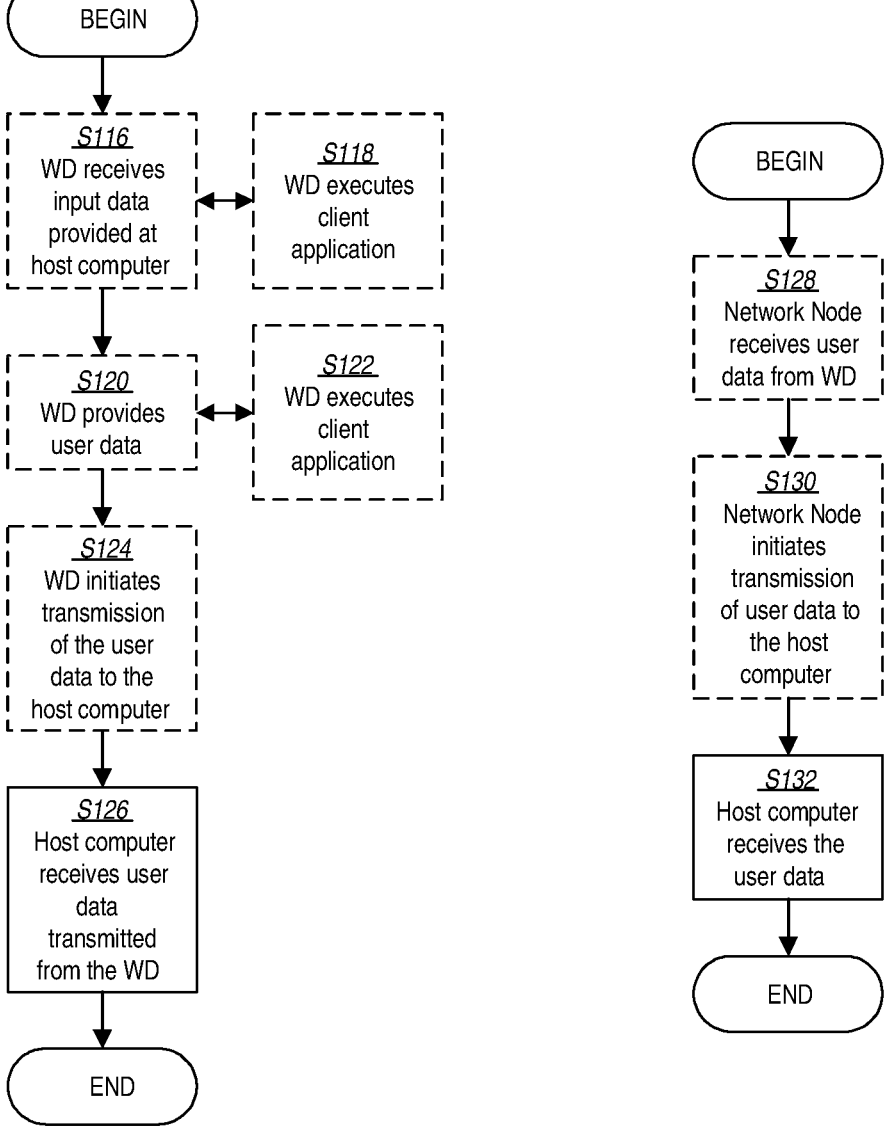
FIG. 7 is a flowchart illustrating example methods implemented in a communication system including a host computer, a network node and a wireless device for receiving user data from the wireless device at a host computer according to some embodiments of the present disclosure.
FIG. 8 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 6, which may be those described with reference to FIGS. 3 and 4. In an optional first step of the method, the WD 6 receives input data provided by the host computer 24 (Block S116). In an optional substep of the first step, the WD 6 executes the client application 92, which provides the user data in reaction to the received input data provided by the host computer 24 (Block S118). Additionally or alternatively, in an optional second step, the WD 6 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 6 may initiate, in an optional third substep, transmission of the user data to the host computer 24 (Block S124). In a fourth step of the method, the host computer 24 receives the user data transmitted from the WD 6, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16 and a WD 6, which may be those described with reference to FIGS. 3 and 4. In an optional first step of the method, in accordance with the teachings of the embodiments described throughout this disclosure, the network node 16 receives user data from the WD 6 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
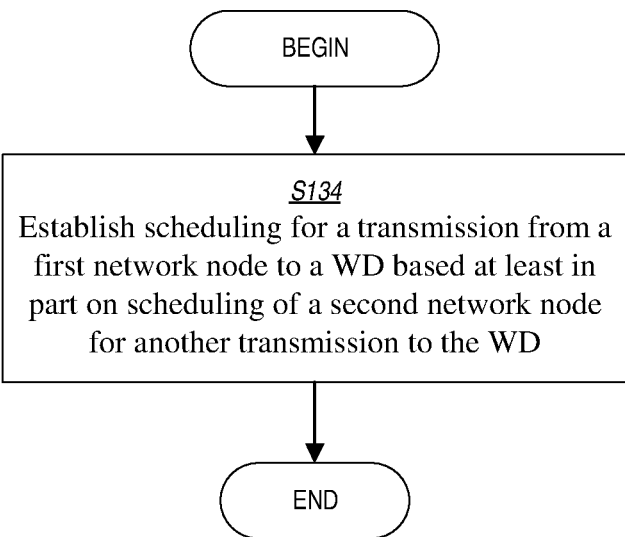
FIG. 9 is a flowchart of an example process for a network node in a first radio area network to communicate with at least a second network node in a second radio area network according to some embodiments of the present disclosure.

FIG. 9 is a flowchart of an example process for a network node 16*a* in a first radio area network, RAN to communicate with at least a second network node 16*b* in a second RAN. One or more Blocks and/or functions performed by the network node 16*a* may be performed by one or more elements of network node 16*a* such as by dual-connectivity scheduling unit 32 in processing circuitry 68, processor 70, communication interface 60, radio interface 62, etc. In one or more embodiments, network node 16*a* such as via one or more of processing circuitry 68, processor 70, radio interface 62 and communication interface 60 is configured to establish (Block S134) scheduling for a transmission from the first network node 16*a* to a wireless device, WD, 6 based at least in part on scheduling of the second network node 16*b* for another transmission to the WD 6.

In one or more embodiments, network node 16*a* such as via one or more of processing circuitry 68, processor 70, radio interface 62 and communication interface 60 is configured to change scheduling for the first network node 16 so that a shorter time interval exists between when an activity is scheduled by the first network node 16 and when a result is broadcast by the first network node 16 than a time interval between when an activity is scheduled by the second node 16 and when a result is broadcast by the second network node 16.

In one or more embodiments, network node 16a such as via one or more of processing circuitry 68, processor 70, radio interface 62 and communication interface 60 is configured to receive from the second network node 16 information indicating the second network node's 16 scheduling activities for the WD 6.

In one or more embodiments, the information indicating the second node's 16 scheduling activities for the WD 6 includes at least one of information indicating scheduling of an activity on an uplink, UL, slot of interest and information indicating a forecast power to be used by WD 6 to execute the activity.

In one or more embodiments, the first RAN is based on 3rd Generation Partnership Project, 3GPP, new radio, NR, standards and the second RAN is based on 3GPP Long-Term-Evolution, LTE, standards.

In one or more embodiments, the first RAN and the second RAN are based on 3rd Generation Partnership Project, 3GPP, new radio, NR, standards.

In one or more embodiments, network node 16a such as via one or more of processing circuitry 68, processor 70, radio interface 62 and communication interface 60 is configured to stop basing scheduling for a transmission to the WD 6 on the second network node's 16 scheduling for a transmission to the WD 6 when a communication link between the first network node 16 and WD 6 is removed. In one or more embodiments, network node 16a such as via one or more of processing circuitry 68, processor 70, radio interface 62 and communication interface 60 is configured to the processing circuitry 68 is further configured to receive an uplink, UL, reference pattern between at least two schedulers.

In one or more embodiments, network node 16a such as via one or more of processing circuitry 68, processor 70, radio interface 62 and communication interface 60 is configured to receive an uplink, UL, reference pattern for multiple WDs 6 on an individual WD 6 by WD 6 basis.

In one or more embodiments, network node 16a such as via one or more of processing circuitry 68, processor 70, radio interface 62 and communication interface 60 is configured to change an uplink, UL, reference pattern.

In one or more embodiments, network node 16a such as via one or more of processing circuitry 68, processor 70, radio interface 62 and communication interface 60 is configured to assess loading of transmissions between the WD 6 and the first network node 16, and the WD 6 and the second network node 16.

In one or more embodiments, network node 16a such as via one or more of processing circuitry 68, processor 70, radio interface 62 and communication interface 60 is configured to alter New Radio, NR, parameter k2.

In one or more embodiments, network node 16a such as via one or more of processing circuitry 68, processor 70, radio interface 62 and communication interface 60 is configured to schedule a downlink, DL, hybrid automatic repeat request, HARQ, response to avoid uplink, UL, slots that have been committed to the second RAN.

In one or more embodiments, network node 16a such as via one or more of processing circuitry 68, processor 70, radio interface 62 and communication interface 60 is configured to the processing circuitry 68 is further configured to determine scheduling based on at least one of a time domain duplex, TDD, pattern, a frequency domain duplex, FDD, pattern and a numerology difference between the first and second RAN.

In one or more embodiments, network node 16a such as via one or more of processing circuitry 68, processor 70, radio interface 62 and communication interface 60 is configured to set a timing parameter for a transmission such that a multi-slot time window exists to convey to information to the first network node 16 about an UL scheduling decision the second network node has made for at least one UL slot.

Having described the general process flow of arrangements of the disclosure and having provided examples of hardware and software arrangements for implementing the processes and functions of the disclosure, the sections below provide details and examples of arrangements for establishing scheduling for a transmission from a first network node 16a to a WD 6 based at least in part on scheduling of a second network node 16b for another transmission to the WD 6.

In some embodiments, capability differences between LTE-based networks and corresponding LTE network nodes 16 and NR-based networks and corresponding NR network nodes 16 are exploited. These differences may include:

The difference in timing between when an UL grant is carried on the Physical Downlink Control Channel (PDCCH) and when the corresponding UL shared channel is transmitted. In NR this time difference is indicated by the parameter k2. In LTE, the time difference is fixed to 4 slots. By using a value of k2=2 (slots), a NR scheduler, such as in network node 16a, can exploit the opportunity to make its UL scheduling decision for a given UL slot after the decision made by an LTE scheduler, such as in network node 16b. As a result, there may exist a multi-slot time window for the LTE scheduler to convey to the NR scheduler information about the UL scheduling decision LTE has made for any particular UL slot.

The difference in timing between when the DL Shared Channel (SCH) is transmitted to WD 6 and when the HARQ response for that transmission is sent on the UL. In NR this time difference is indicated by the parameter k1. In LTE, the time difference is fixed to 4 slots. By using a value of k1=2 or 3 (slots), the NR scheduler can schedule the DL HARQ response to avoid UL slots that have been committed to LTE.

A pre-selected UL pattern (termed the "UL reference pattern") may provide certainty to both NR and LTE on what can be scheduled in the UL without fast communication between the two schedulers. This pattern may be designed to respect any periodic UL commitments on either leg, for example periodic Channel State Information (CSI) reporting, and take into account the LTE 8 subframe HARQ re-transmit pattern for UL.

In some embodiments, the NR scheduler, i.e. in network node 16, rapidly adjusts to LTE decisions (one-way fast adaptivity). This means that the LTE throughput behavior is capped by the reference UL pattern. This is done to favor NR and because NR is inherently more flexible and therefore able to adapt if/when LTE frees an UL slot. Slow adaptivity may be applied to the LTE leg by adjusting the UL reference pattern in an outer loop control type fashion. The UL reference pattern is optional and may be included to address single-uplink operation. The UL reference pattern is normally generated by the DC "master node" or controlling node and can be conveyed via the 3GPP X2AP protocol.

In some embodiments, the UL reference patterns used and scheduling decisions made are on a per-WD 6 basis. In other words, reference patterns and scheduling are determined/ made individually for each WD 6. When EN-DC is set up for any given WD 6, the MN and SN may exchange identifiers so that any shared WD 6 can be uniquely referred to. Alternatively or additionally, a shared identifier can be exchanged between the two schedulers over the MAC-to-MAC scheduler interface.

Figure 10:
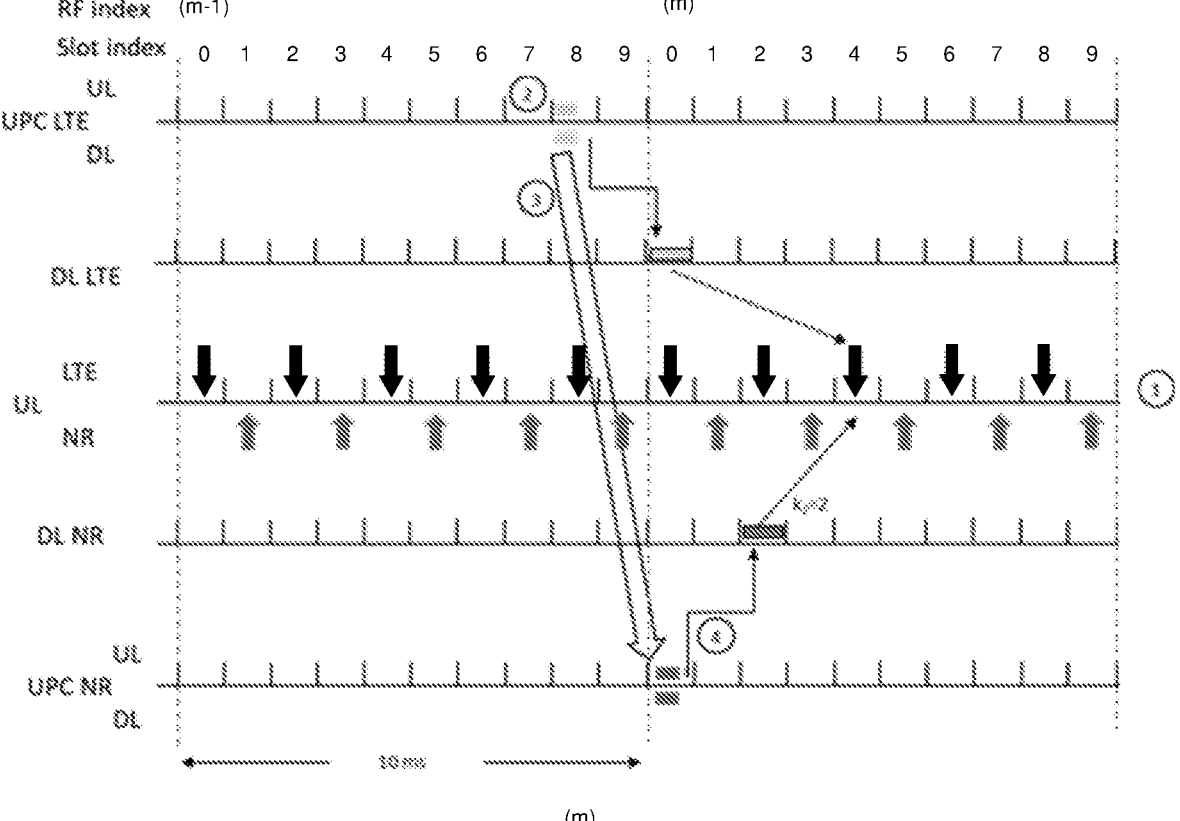
FIG. 10 is an illustration of example steps for executing coordinated UL in EN-DC according to some embodiments of the present disclosure.

Steps for executing coordinated UL scheduling in EN-DC according to some embodiments are shown in FIG. 10 and described below. For the purposes of illustration, it may be assumed that for both NR and LTE, the UL and DL scheduling takes place 2 slots before the corresponding PDCCH is transmitted. However, the details may be specific to particular embodiments and implementations and are not limited solely two 2 slots.

1. A reference UL pattern (shown as alternating even and odd numbered slot indices in FIG. 10) is established between the LTE and the NR nodes 16 on a per WD 6 basis. This pattern may be used to indicate committed UL slots that each leg (LTE or NR) can be assured are available for its respective UL scheduling operations, unless otherwise informed via communication over a link such as a MAC-to-MAC scheduler communication link. In some embodiments, this pattern can also be communicated from the MN, e.g., network node 16b, to the SN, e.g., network node 16a, through standardized Xn communication, or through scheduler-to-scheduler communication via a MAC-to-MAC scheduler link.

2. In each slot, the LTE network node 16b will perform its UL and DL scheduling operations. In the example shown in FIG. 10, consider LTE scheduling performed in slot 8 of radio frame (m−1). The LTE PDCCH that coveys the LTE scheduling information to the WD 6 is transmitted over the air in slot 0 of radio frame (m). For a given WD 6, the PDCCH may contain a DL Physical Downlink Shared Channel (PDSCH) request, and/or a UL Physical Uplink Shared Channel (PUSCH) grant, or neither, among other things.

a. If the PDCCH contains a PDSCH request for the WD 6 under consideration, the corresponding HARQ response will be transmitted in the UL on radio frame (m), slot 4.

b. If the PDCCH contains a PUSCH grant for the WD 6 under consideration), the corresponding UL SCH will be transmitted in the UL on radio frame (m), slot 4.

3. After the LTE node 16b scheduler makes its decision in slot 8 of radio frame (m−1), this information is relayed to the NR node 16a scheduler. This information must arrive in time for use by the NR scheduler when it is making decision about possible use of radio frame (m), slot 4. In FIG. 10, this means the information must arrive by slot 0 of radio frame (m).

4. The information transferred to the NR node 16a scheduler, e.g., dual-connectivity scheduling unit 32, only need include a list of the WDs 6 scheduled on LTE. For any WD 6 that does not appear in the list, it is safe to assume that such a WD 6 is not using the indicated UL slot and NR scheduling can use the UL slot. For each scheduled WD 6 in the list:

a. If it is desired to perform only single UL transmission (i.e. the UL slot can be used only by one radio access technology at a time), the NR node 16a scheduler e.g., dual-connectivity scheduling unit 32, will not attempt to schedule the same WD 6 in this slot. Note that, as described above, an NR DL transmission can still take place. However, in this case the DL HARQ response will be directed to frame (m), slot 5 by using a k1 value of 3.

b. If it is desired to perform simultaneous transmissions on the LTE and NR legs, then the transferred list may also include an estimate of the UL power (or equivalent type of information) to be used by the WD 6 for its LTE scheduling. The remaining WD 6 power is available for NR UL scheduling. If the specifics of LTE PRB use are important for IMD avoidance, LTE PRB utilization can also be conveyed to the NR node 16a.

The approach is robust to inter-NB communication signal loss (including signal corruption) or the late arrival of the signal. In these cases, if the NR node 16a scheduler, e.g. dual-connectivity scheduling unit 32, has to make a decision and it has no information from the LTE scheduler, the NR node 16a scheduler assumes that the LTE node 16b scheduler, e.g. dual-connectivity scheduling unit 32, has made decisions following the UL reference pattern.

Embodiments are quite scalable as the information contained in the inter-scheduler signal is relatively small and only contains data about EN-DC WDs 6 that are to be scheduled in a specific UL slot for a particular EN-DC cell combination.

Figure 11:
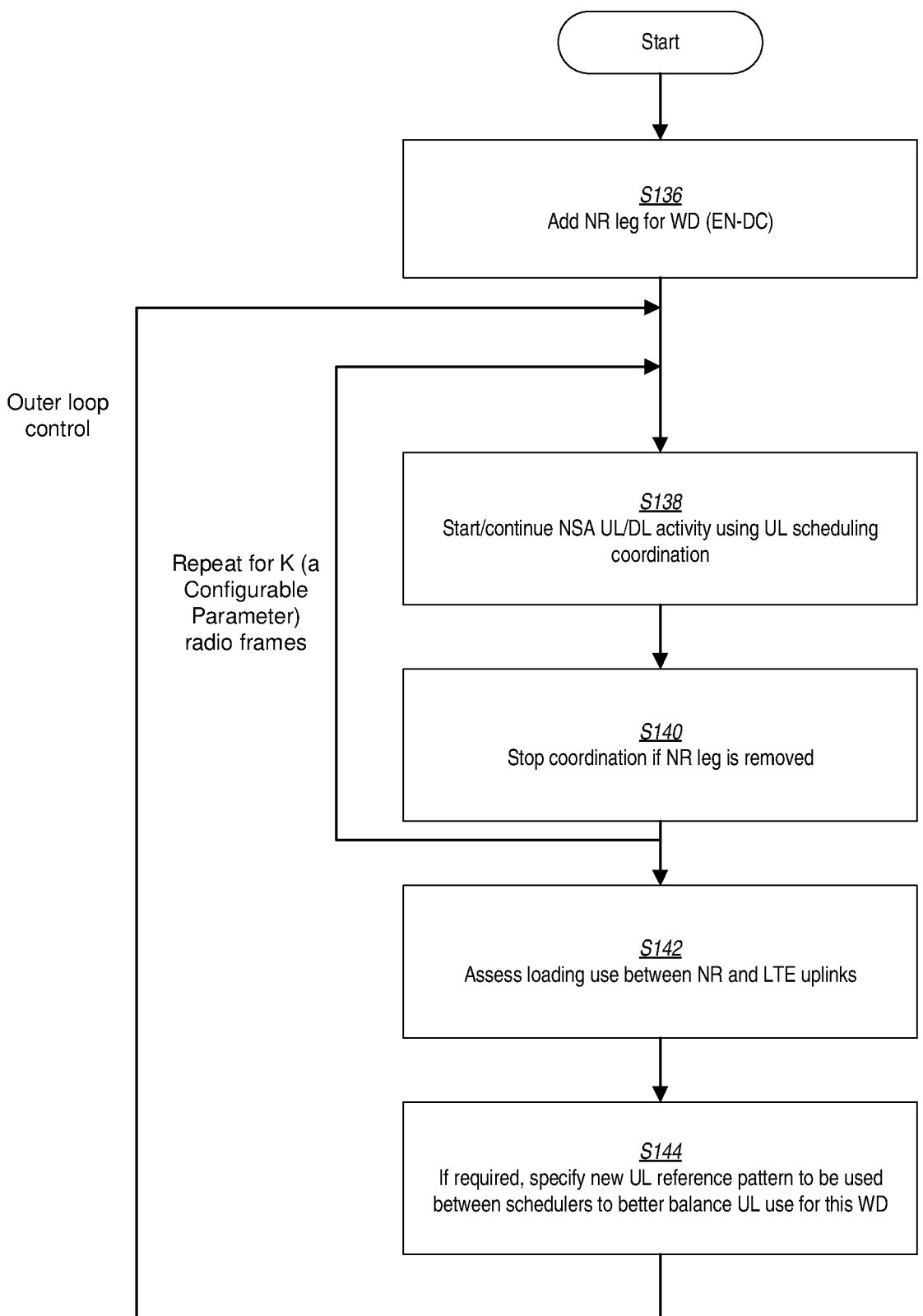
FIG. 11 is a flowchart illustrating an algorithm operation including outer loop control for adjusting the UL reference pattern in accordance with some embodiments.

FIG. 11 is a flowchart showing an example algorithm operation including outer loop control for adjusting the UL reference pattern in accordance with some embodiments. The algorithm may be performed by a dual-connectivity scheduling units 32 in one or more network nodes 16. The outer loop control of the UL reference pattern may be performed locally or handled by some entity in the RAN. In accordance with the algorithm, a NR leg is added (Block S136) for a WD 6. NSA UL/DL activity is started or continued (Block S138) using UL scheduling coordination. Coordination is stopped (Block S140) if the NR leg is removed. Blocks S136 and S138 are repeated for K radio frames. Loading use between NR and LTE uplinks is assessed (Block S142). If required, a new UL reference pattern is specified (Block S144) to be used between schedulers to better balance UL use for this WD 6. The algorithm then returns to Block S138.

Some embodiments may be limited to low band carriers using a common numerology. In principle, this concept can be applied for a WD 6 performing dual connectivity across a set of carriers provided that scheduling timing offsets can be guaranteed between the carriers and these offsets are sufficient for inter-scheduler communication. In some embodiments, both network nodes 16 may be operating according to the same radio technology, e.g., both network nodes 16 are 3GPP NR nodes. In such embodiments, the same general approach applies as for LTE-NR DC. However, in the NR-NR case both sides may have k1, k2 flexibility. The specifics of how UL use is handled may depend on the numerology between the two network nodes 16 as well as the TDD and FDD patterns used.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first network node in a first radio area network, RAN, configured to communicate with at least a second network node in a second RAN, the first network node comprising processing circuitry configured to:

establish scheduling for a transmission from the first network node to a wireless device, WD, based at least in part on scheduling of the second network node for another transmission to the WD;

change scheduling for the first network node so that a shorter time interval exists between when an activity is scheduled by the first network node and when a result is broadcast by the first network node than a time interval between when an activity is scheduled by the second node and when a result is broadcast by the second network node; and stop basing scheduling for a transmission to the WD on the second network node's scheduling for a transmission to the WD when a communication link between the first network node and WD is removed.

2. The first network node of claim 1, wherein the first network node receives from the second network node information indicating the second network node's scheduling activities for the WD.

3. The first network node of claim 2, wherein the information indicating the second node's scheduling activities for the WD includes at least one of information indicating scheduling of an activity on an uplink, UL, slot of interest and information indicating a forecast power to be used by WD to execute the activity.

4. The first network node of claim 1, wherein the first RAN is based on 3rd Generation Partnership Project, 3GPP, new radio, NR, standards and the second RAN is based on 3GPP Long-Term-Evolution, LTE, standards.

5. The first network node of claim 1, wherein the first RAN and the second RAN are based on 3rd Generation Partnership Project, 3GPP, new radio, NR, standards.

6. The first network node of claim 1, wherein the processing circuitry is further configured to receive an uplink, UL, reference pattern between at least two schedulers.

7. The first network node of claim 1, wherein the processing circuitry is further configured to receive an uplink, UL, reference pattern for multiple WDs on an individual WD by WD basis.

8. The first network node of claim 1, wherein the processing circuitry is further configured to change an uplink, UL, reference pattern.

9. The first network node of claim 1, wherein the processing circuitry is further configured to assess loading of transmissions between the WD and the first network node, and the WD and the second network node.

10. The first network node of claim 1, wherein the processing circuitry is further configured to alter New Radio, NR, parameter k2.

11. The first network node of claim 1, wherein the processing circuitry is further configured to schedule a downlink, DL, hybrid automatic repeat request, HARQ, response to avoid uplink, UL, slots that have been committed to the second RAN.

12. The first network node of claim 1, wherein the processing circuitry is further configured to determine scheduling based on at least one of a time domain duplex, TDD, pattern, a frequency domain duplex, FDD, pattern and a numerology difference between the first and second RAN.

13. The first network node of claim 1, wherein the processing circuitry is further configured to set a timing parameter for a transmission such that a multi-slot time window exists to convey to information to the first network node about an UL scheduling decision the second network node has made for at least one UL slot.

14. A method performed by a first network node in a first radio area network, RAN, configured to communicate with at least a second network node in a second RAN, the method comprising:

establishing scheduling for a transmission from the first network node to a wireless device, WD, based at least in part on scheduling of the second network node for another transmission to the WD;

changing scheduling for the first network node so that a shorter time interval exists between when an activity is scheduled by the first network node and when a result is broadcast by the first network node than a time interval between when an activity is scheduled by the second node and when a result is broadcast by the second network node; and stopping the basing of the scheduling for a transmission to the WD on the second network node's scheduling for a transmission to the WD when a communication link between the first network node and WD is removed.

15. The method of claim 14, further comprising the first network node receiving from the second network node information indicating the second network node's scheduling activities for the WD.

16. The method of claim 15, wherein the information indicating the second node's scheduling activities for the WD includes at least one of information indicating scheduling of an activity on an uplink, UL, slot of interest and information indicating a forecast power to be used by WD to execute the activity.

17. The method of claim 14, wherein the first RAN is based on 3rd Generation Partnership Project, 3GPP, new radio, NR, standards and the second RAN is based on 3GPP Long-Term-Evolution, LTE, standards.

18. The method of claim 14, wherein the first RAN and second RAN are based on 3rd Generation Partnership Project, 3GPP, new radio, NR, standards.

19. The method of claim 14, further comprising receiving an uplink, UL, reference pattern between at least two schedulers.

20. The method of claim 14, further comprising receiving an uplink, UL, reference pattern for multiple WDs on an individual WD by WD basis.

21. The method of claim 14, further comprising changing an uplink, UL, reference pattern.

22. The method of claim 14, further comprising assessing loading of transmissions between the WD and the first network node, and the WD and the second network node.

23. The method of claim 14, further comprising altering New Radio, NR, parameter k2.

24. The method of claim 14, further comprising scheduling a downlink, DL, hybrid automatic repeat request, HARQ, response to avoid uplink, UL, slots that have been committed to the second RAN.

25. The method of claim 14, further comprising determining scheduling based on at least one of a time domain duplex, TDD, pattern, a frequency domain duplex, FDD, pattern and a numerology difference between the first and second RAN.

26. The method of claim 14, further comprising set a timing parameter for a transmission such that a multi-slot time window exists to convey to information to the first network node about an UL scheduling decision the second network node has made for at least one UL slot.

* * * * *